United States Patent [19]

Griffin

[11] 3,831,878

[45] Aug. 27, 1974

[54] RESTRAINT BELT RETRACTOR

[75] Inventor: Henry W. Griffin, Birmingham, Mich.

[73] Assignee: General Motors Corporation, Detroit, Mich.

[22] Filed: May 21, 1973

[21] Appl. No.: 362,494

[52] U.S. Cl............................ 242/107.4, 74/577 S
[51] Int. Cl....................... A62b 35/02, B65h 63/04
[58] Field of Search........ 242/107.4, 107 SB, 101.2, 242/107.3, 107.5, 107.6, 107.7, 107 R, 99; 297/386, 387, 388; 280/150 SB; 188/135, 139, 82.7; 74/576, 575, 577 R, 577 S

[56] References Cited
UNITED STATES PATENTS

| 3,226,053 | 12/1965 | Petty | 242/107.4 |
| 3,489,367 | 1/1970 | Kovacs et al. | 242/107.4 |
| 3,667,698 | 6/1972 | Fisher | 242/107.4 |
| 3,741,496 | 6/1973 | Beller | 242/107.4 |

Primary Examiner—John W. Huckert
Assistant Examiner—Jon W. Henry
Attorney, Agent, or Firm—J A. Kushman

[57] ABSTRACT

A vehicle occupant restraint belt retractor including a metallic locking member gravity biased to an unlocked position out of engagement with annular ratchet configurations on metallic end plates of the retractor belt reel to allow unwinding belt rotation of the reel. An inertia member responsive to abrupt horizontal vehicle acceleration or deceleration moves the locking member to a locked position in engagement with radial locking surfaces of the ratchet configurations so as to prevent belt unwinding rotation of the reel. Plastic disks carried by the reel alongside the end plates include cushioning portions which prevent metal-to-metal engagement between the locking member and connecting surfaces of the ratchet configurations that extend generally circumferentially of the reel between the inner and outer ends of adjacent locking surfaces. The plastic cushioning portions thus mitigate rattling noise of the retractor when vertical acceleration pulses move the locking member to locked position, such as during use of the retractor on a vehicle negotiating a bumpy road.

3 Claims, 8 Drawing Figures

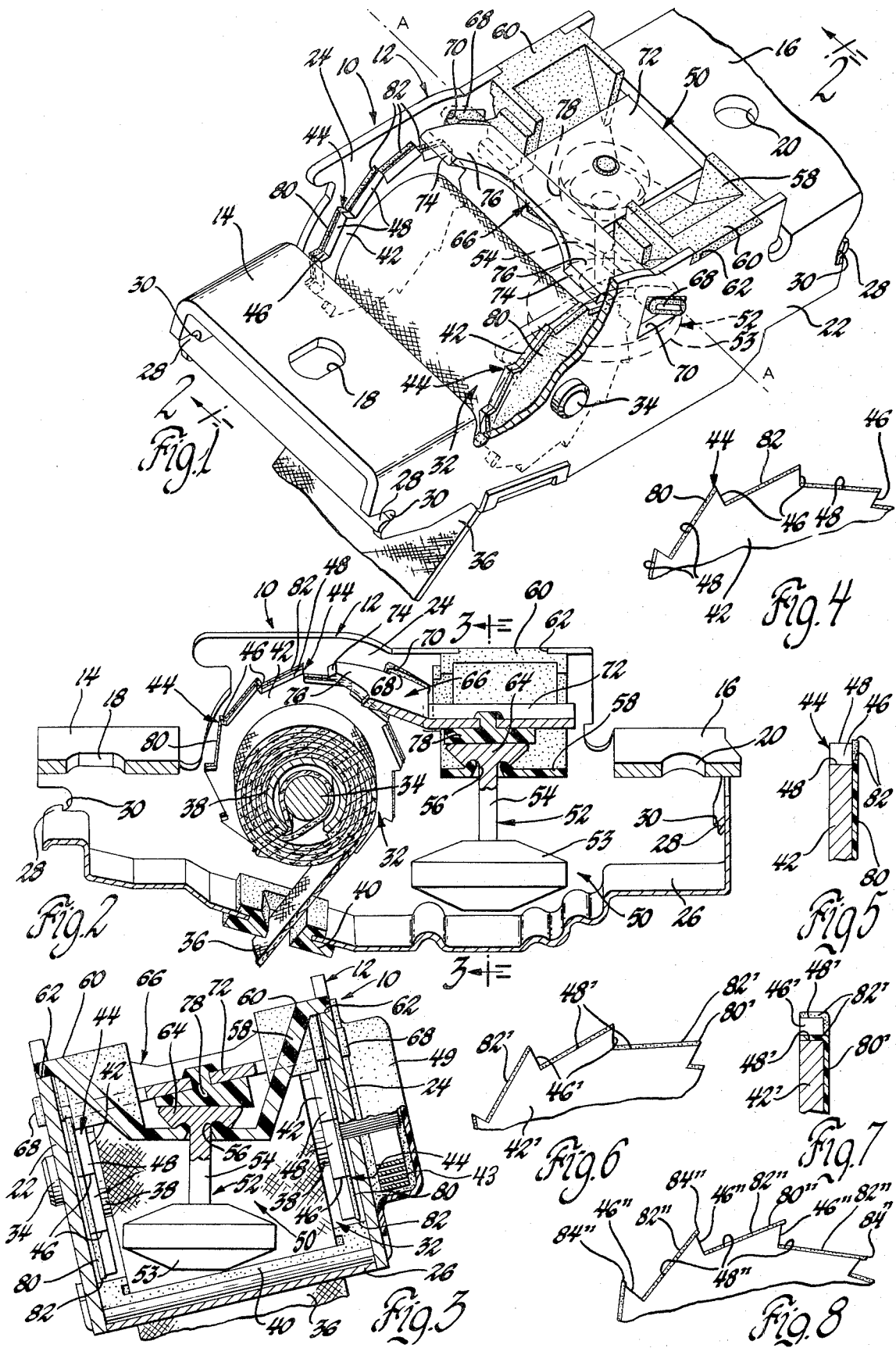

RESTRAINT BELT RETRACTOR

BACKGROUND OF THE INVENTION

This invention relates to a vehicle occupant restraint belt retractor whose locking is actuated in response to abrupt vehicle acceleration or deceleration.

It is well known to provide a vehicle occupant restraint belt retractor in which locking is actuated by a suitable inertia member that moves in response to abrupt horizontal vehicle acceleration or deceleration in order to move a metallic locking member from an unlocked position to a locking position. In certain of these types of retractors, the locking member is gravity biased to its unlocked position and will thus move to locked position upon being subjected to vertical acceleration pulses such as those present when a vehicle is negotiating a bumpy road. When located in the locked position, spaced locking portions of the locking member engage metallic end plates of a belt reel that windingly receives an occupant restraint belt. This engagement prevents unwinding of the belt to thereby restrain a belted occupant of the vehicle. The end plates of the belt reel define annular ratchet configurations including radial locking surfaces and generally circumferential connecting surfaces extending between the inner and outer ends of the adjacent locking surfaces. The locking engagement between the locking portions of the locking member and the end plates of the reel is at the locking surfaces of the ratchet configurations. The locking portions of the locking member also move into metal-to-metal engagement with the connecting surfaces of the ratchet configurations when the locking member moves to locked position under the impetus of vertical acceleration pulses, such as during use of the retractor on a vehicle negotiating a bumpy road.

SUMMARY OF THE INVENTION

This invention provides a vehicle occupant restraint belt retractor with a gravity biased metallic locking member moved to locked position by an inertia member responsive to abrupt horizontal vehicle acceleration or deceleration, and with noise mitigating cushioning portions carried by the belt reel so as to prevent metal-to-metal engagement between the locking member and circumferential connecting surfaces of annular ratchet configurations on metallic end plates of the retractor belt reel. The retractor thus provides improved noise characteristics over past retractors of its type when used on a vehicle negotiating a bumpy road. The cushioning portions are preferably plastic and integral with a pair of disks respectively supported by the end plates of the belt reel. In one embodiment, the cushioning portions are located in the same planes as their disks and extend radially outward of the connecting surfaces of the end plate ratchet configurations in order to prevent metal-to-metal engagement of these surfaces and the locking member. In another embodiment, the cushioning portions have flanged configurations and cover the connecting surfaces.

BRIEF DESCRIPTION OF THE DRAWINGS

The objects, features and advantages of the present invention are readily apparent from the following detailed description of the preferred embodiments and the drawings in which:

FIG. 1 is a partially broken away perspective view of an occupant restraint belt retractor that is constructed according to this invention so as to prevent metal-to-metal engagement of the locking portions of its locking member with the circumferentially extending connecting surfaces of annular ratchet configurations on the end plates of the retractor belt reel;

FIG. 2 is a longitudinal sectional view of the retractor taken generally along line 2—2 of FIG. 1;

FIG. 3 is an end sectional view of the retractor taken generally along line 3—3 of FIG. 2;

FIGS. 4 and 5 are partial views of one of the end plates of the retractor belt reel shown in FIGS. 1 - 3 and respectively show side and end viewpoints of this end plate and a plastic noise mitigating disk carried by the end plate;

FIGS. 6 and 7 are views taken in a manner similar to FIGS. 4 and 5 and show another embodiment of the plastic noise mitigating disk; and FIG. 8 is a view similar to FIGS. 4 and 6 showing another modification of the disk.

DETAILED DESCRIPTION OF THE PREFERRED EMBODIMENTS

Referring now to FIGS. 1 - 3 of the drawings, an occupant restraint belt retractor 10 includes a metallic housing 12 with mounting flanges 14 and 16 at its opposite ends. These mounting flanges defined respective apertures 18 and 20 for receiving bolts that secure the retractor to a vehicle body. Spaced parallel side walls 22 and 24 of the housing are located at the ends of the mounting flanges and extend generally perpendicular to the planes of these flanges. A corrugated cover member 26 is located between the side walls 22 and 24 of the retractor housing and includes mounting ears 28 at each side of both of its ends. These mounting ears engage attachment surfaces 30 on the side walls of the housing and thereby secure the cover member in position closing the lower side of the retractor. A similar cover member may be utilized to close the upper side of the retractor.

The retractor 10 includes a belt reel 32 that is rotatably supported by a shaft 34 extending between the side walls 22 and 24. A belt 36 is looped over shaft 34, see FIG. 2 particularly, and is wrapped around a somewhat rounded horseshoe-shaped drum 38 encircling the shaft. From the drum 38, the belt extends downwardly through a slotted belt guide 40 that is suitably mounted by the cover member 26. Each end of the drum 38 and the shaft 34 are suitably fixed to metallic end plates 42 of the belt reel. These end plates axially position the belt as it is wound on the reel, and the peripheries of the end plates define annular ratchet configurations 44 including circumferentially spaced radial locking surfaces 46 and connecting surfaces 48 extending generally circumferentially of the belt reel between the inner and outer ends of the adjacent locking surfaces 46. A spiraling torsion spring 43, FIG. 3, is connected to the right-hand end of shaft 34. This spring 43 also has an outer end, not shown, suitably fixed to the housing side wall 24 so that the spring biases the belt reel 32 in a belt winding direction. The spring 43 is enclosed by a plastic cover 49 with a cup-shaped configuration that is suitably fixed to housing side wall 24.

A locking mechanism 50 of the retractor includes a pendulum 52 located laterally adjacent the belt reel 32. Pendulum 52 includes a lower weight 53 attached to the lower end of a vertical pendulum arm 54. The upper end of the pendulum arm 54 extends upwardly through an aperture 56 in a plastic pendulum support member 58, see FIG. 3. This pendulum support member has an unsymmetrical U-shaped configuration and includes upper mounting lugs 60 at each of its sides. These mounting lugs are respectively received by apertures 62 in the side walls 22 and 24 of the retractor housing, FIG. 1, so as to secure this support member in position. Above the aperture 56 of the pendulum support member, the upper end of pendulum arm 54 mushrooms outwardly and defines a control portion 64. The control portion 64 seats against the pendulum support member so that the pendulum arm 54 is located in a depending vertical orientation. The unsymmetrical nature of the pendulum support member 58 allows the mounting flanges 14 and 16 of the retractor housing to be mounted on the vehicle body in a skewed relationship relative to the horizontal while still allowing the vertical depending orientation of the pendulum arm 54.

A metallic locking member 66 of locking mechanism 50 has a generally fork-like configuration and includes plastic covered mounting ears 68 that are received gy generally wedge-shaped apertures 70 of the retractor side walls so as to mount the locking member for rotational movement about an axis A—A. A handle portion 72 of the locking member biases this member about this axis of support to the unlocked position shown in FIG. 2. Locking portions 74 on the tine portions 76 of the locking member are located out of engagement with the upper side of belt reel 32 in this unlocked position so as to allow unwinding rotational movement of the belt reel and extension of belt 36 from the retractor. The handle portion 71 of the locking member carries a wedge-shaped plastic button 78 whose lower side engages the control portion 64 at the upper end of pendulum arm 54 when in the FIG. 2 position. Upon swinging movement of the pendulum 50 from its FIG. 2 vertical orientation in response to abrupt horizontal vehicle acceleration or deceleration, the pendulum tips so as to move the button 78 and the handle portion 72 of the locking member upwardly. This upward movement of the handle portion moves the locking member about axis A—A to a locked position where the locking portions 74 engage a selected set of the locking surfaces 46 at the upper side of belt reel 32 so as to thereby prevent unwinding belt rotation of the reel and extension of belt 36 from the retractor.

The details of the retractor thus far described are similar to the retractor disclosed by U.S. Pat. application Ser. No. 348,963, filed on Apr. 9, 1973, and assigned to the assignee of the present invention.

When utilized with a vehicle negotiating a bumpy road, the retractor is subjected to vertical acceleration pulses. Some of these pulses are large enough to act against the gravity bias of locking member 66 and to move the locking member momentarily to its locked position in engagement with the end plates of the belt reel at the upper side of the reel. This engagement would be between the locking portions 74 of the locking member and the connecting surfaces 48 of the ratchet configurations in a metal-to-metal manner causing rattling noise were it not for the provisions of this invention.

As seen best in FIG. 3, a pair of plastic disks 80 are respectively located at the outer sides of end plates 42.

The disks are fixed to the end plates by an adhesive bonding agent or by any other conventional attachment method so as to rotate with the belt reel 32. The plastic the disks are composed of preferably has good molding characteristics so that the disks can be injection molded. At their peripheries, as seen by additionally referring to FIGS. 4 and 5, the disks include cushioning portions 82 that have slightly larger radii than the laterally adjacent connecting surfaces 48 of the end plates. The cushioning portions thus extend radially outward of their associated connecting surfaces 48 so as to prevent metal-to-metal engagement between the locking portions 74 of the locking member 66 and the connecting surfaces 48 when the locking member moves to locked position. Thus, when the retractor is used on a vehicle operating on a bumpy road so that the locking member moves to locked position in response to vertical acceleration pulses and slaps into and out of engagement with the belt reel 32, rattling noise of the retractor is mitigated by the plastic cushioning portions 82. However, the cushioning portions 82 do not extend radially outward past the connecting surfaces 48 far enough to interfere with metal-to-metal locking engagement of the locking portions 74 on the locking member with the radial locking surfaces 46.

In FIGS. 6 and 7, another embodiment of the plastic disk is indicated by 80' and includes integral cushioning flange portions 82' at its periphery. These cushioning flange portions are normal to the plane of the disk and completely cover the connecting surfaces 48' of the associated belt reel end plate 42'. Thus, these flange portions 82' function in a manner similar to the previously described cushioning portions 82 so as to prevent metal-to-metal engagement of the locking member with the belt reel and to thereby mitigate rattling noise of the retractor.

FIG. 8 shows another modification of the plastic noise mitigating disk which is indicated by 80". The cushioning portions 82" of this disk may have the configuration of either the cushioning portions 82 shown in FIGS. 4 and 5 or the cushioning portions 82' shown in FIGS. 6 and 7. Regardless which of these configurations the cushioning portions 82" assume, they also include extension 84" extending slightly over the adjacent locking surfaces 46" so as to prevent the locking portions 74 of the locking member from bouncing out of engagement with the belt reel after moving under the extensions but before moving into engagement with the locking surfaces of the end plate 42".

It is of course possible to use other materials than plastic in order to prevent the metal-to-metal engagement of the metallic locking member 66 with the circumferential connecting surfaces of the metallic end plates in the noise mitigating manner described while still allowing locking engagement of the locking member with the radial locking surfaces of the end plates. Also, the manner in which these materials are carried by the belt reel may be arranged in different configurations than the embodiments described to achieve the same result. Also, this concept may be used with retractors having inertia members other than pendulums which are responsive to horizontal vehicle acceleration or deceleration.

It is believed evident from the foregoing description that this invention provides an improved occupant restraint belt retractor in which rattling noise is mitigated.

What is claimed is:

1. A vehicle inertia type locking occupant restraint belt retractor comprising:

a housing including spaced generally parallel opposed walls and having means adaptable to allow mounting of the retractor on a vehicle body;

a belt reel rotatably supported between the walls of the housing for movement in both belt winding and belt unwinding directions, the belt reel including a pair of metallic end plates defining annular ratchet configurations with circumferentially spaced locking surfaces facing in the direction of belt unwinding rotation of the reel and with connecting surfaces extending generally circumferentially between the inner and outer ends of the adjacent locking surfaces;

spring means normally biasing the reel in the belt winding direction of rotation;

a metallic locking member having a pair of laterally spaced locking portions and a weighted biasing portion;

support means pivotally mounting the locking member between the walls of the housing for movement between:

a locked position where the locking portions are respectively engageable with a selected pair of locking surfaces of the end plates to thereby prevent belt unwinding rotation of the reel, and an unlocked position to which the locking member is normally gravity biased by the weighted biasing portion thereof so as to disengage the locking portions from the belt reel and to allow belt unwinding rotation of the reel;

an inertia member for moving the locking member to locked position in response to changes in the rate of horizontal vehicle movement; and a pair of plastic disks respectively mounted on the end plates of the reel and including integral cushioning portions extending radially outwardly of the connecting surfaces of the ratchet configurations on the end plates to a limited extent so as to prevent metal-to-metal engagement of the locking portions of the locking member with the connecting surfaces and to thereby mitigate rattling noise of the retractor when the retractor is subjected to vertical acceleration that acts on the weighted biasing portion of the locking member to move this member to locked position, the cushioning portions allowing metal-to-metal locking engagement of the locking portions with the locking surfaces of the end plates when the locking member is moved to locked position by the inertia member.

2. A vehicle inertia type locking occupant restraint belt retractor comprising:

a housing including spaced generally parallel opposed walls and having means adaptable to allow mounting of the retractor on a vehicle body;

a belt reel rotatably supported between the walls of the housing for movement in both belt winding and belt unwinding directions, the belt reel including a pair of metallic end plates defining annular ratchet configurations with circumferentially spaced locking surfaces facing in the direction of belt unwinding rotation of the reel and with connecting surfaces extending generally circumferentially between the inner and outer ends of the adjacent locking surfaces;

spring means normally biasing the reel in the belt winding direction of rotation;

a metallic locking member having a pair of laterally spaced locking portions and a weighted biasing portion;

support means pivotally mounting the locking member between the walls of the housing for movement between:

a locked position where the locking portions are respectively engageable with a selected pair of locking surfaces of the end plates to thereby prevent belt unwinding rotation of the reel, and an unlocked position to which the locking member is normally gravity biased by the weighted biasing portion thereof so as to disengage the locking portions from the belt reel and to allow belt unwinding rotation of the reel;

an inertia member for moving the locking member to locked position in response to changes in the rate of horizontal vehicle movement; and a pair of plastic disks respectively mounted on the end plates of the reel and including integral cushioning flange portions extending over the connecting surfaces of the ratchet configurations on the end plates so as to prevent metal-to-metal engagement of the locking portions of the locking member with the connecting surfaces and to thereby mitigate rattling noise of the retractor when the retractor is subjected to vertical acceleration that acts on the weighted biasing portion of the locking member to move this member to locked position, the flange portions having a limited thickness to allow metal-to-metal locking engagement of the locking portions with the locking surfaces of the end plates when the locking member is moved to locked position by the inertia member.

3. The retractor of claim 1 in which the cushioning portions include extensions that respectively extend circumferentially of the reel in the belt unwinding direction of rotation over the locking surfaces of the end plates to prevent the locking portions from bouncing out of engagement with the reel after moving under the extensions.

* * * * *